F. J. DEISZ.
Neck-Yokes.

No. 149,450.

Patented April 7, 1874.

Witnesses.
F. C. Brecht.
Will H. Moxon.

Inventor.
Frank J. Deisz
per attys.
A. H. & R. K. Evans

UNITED STATES PATENT OFFICE.

FRANK J. DEISZ, OF PIERCE CITY, MISSOURI, ASSIGNOR OF ONE-HALF HIS RIGHT TO FRANCIS A. VICKORY.

IMPROVEMENT IN NECK-YOKES.

Specification forming part of Letters Patent No. 149,450, dated April 7, 1874; application filed January 3, 1874.

*To all whom it may concern:*

Be it known that I, FRANK J. DEISZ, of Pierce City, in the county of Lawrence and State of Missouri, have invented a new and Improved Neck-Yoke Tongue-Holder; and I hereby declare the following to be a full, clear, and exact description thereof, reference being had to the accompanying drawings, making part of this specification, in which—

Figure 1:
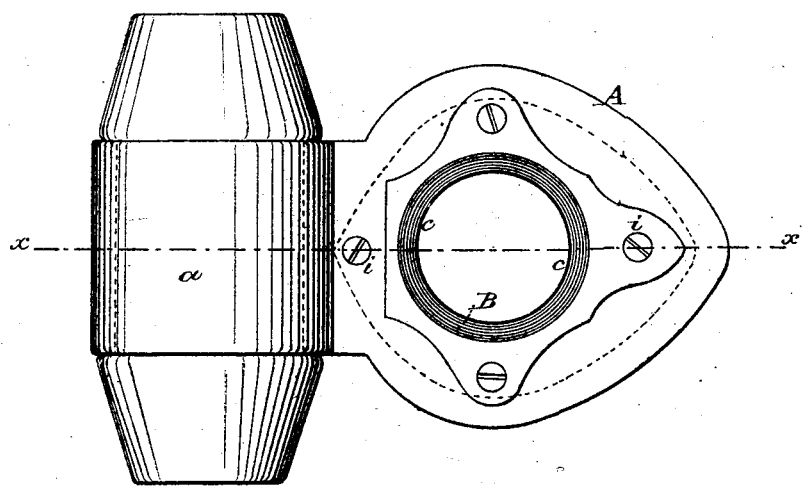
Figure 2:
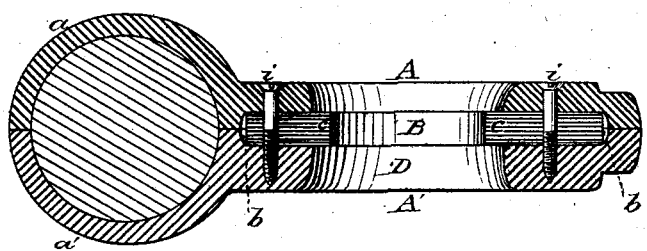

Figure 1 is a plan view of my device. Fig. 2 is a longitudinal vertical section on the line $x\,x$ of Fig. 1.

My invention consists of a holder made of metal, or other harder material, inclosing an elastic washer which projects within the opening for the tongue, said metal holder being offset to receive the washer, and so arranged that the screws pass through the washer and prevent its being withdrawn from the holder by the action of the pole.

Referring to the accompanying drawings, A A' are two pieces of metal, cast or upset in substantially the form shown. The portions $a\,a'$ clasp the cross or yoke bar, and the insides are offset at $b\,b$, for the reception of a washer of leather, rubber, or other suitable material. (Seen at B.) The washer B is annular, and is made of such a size that when the pieces A A' are bolted together over it the portion $c\,c$ (see Fig. 1) projects into the opening D in the metal portion of the holder. Screws or rivets $i\,i$ clamp the pieces A A' together when the washer is inserted. When the washer becomes worn the screws $i\,i$ are removed, the pieces A A' taken apart, a new washer inserted, and then the pieces again secured; or the washer may be revolved so as to bring the wear upon a fresh part thereof.

I am aware that neck-yokes have been made with rubber inserted in a ring recessed to hold it; but in such cases the rubber is liable to be thrown out of the metal ring, while the rubber held between my plates is secured in position by the screws and cannot be displaced.

Having thus described my invention, what I claim as new, and desire to secure by Letters Patent, is—

The plate A and plate A', in combination with the washer B and screws $i\,i$, all constructed as and for the purpose set forth.

FRANK JOSEPH DEISZ.

Witnesses:
JOSEPH S. BALL,
WILLIAM BUDNER.